(12) United States Patent
Kojima et al.

(10) Patent No.: US 11,971,164 B1
(45) Date of Patent: Apr. 30, 2024

(54) STEERING DEVICE

(71) Applicant: TOYODA GOSEI CO., LTD., Kiyosu (JP)

(72) Inventors: Fumiyasu Kojima, Kiyosu (JP); Takanori Yamada, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 18/498,638

(22) Filed: Oct. 31, 2023

(30) Foreign Application Priority Data

Nov. 18, 2022 (JP) .................................. 2022-184535
Aug. 4, 2023 (JP) .................................. 2023-127679

(51) Int. Cl.
*F21V 5/04* (2006.01)
*B60Q 3/283* (2017.01)
*B62D 1/06* (2006.01)

(52) U.S. Cl.
CPC ................ *F21V 5/04* (2013.01); *B60Q 3/283* (2017.02); *B62D 1/06* (2013.01)

(58) Field of Classification Search
CPC .............. B60Q 3/283; B62D 1/06; F21V 5/04
See application file for complete search history.

(56) References Cited

U.S. PATENT DOCUMENTS

2021/0221285 A1 7/2021 Kihara et al.

FOREIGN PATENT DOCUMENTS

JP 2018-111440 A 7/2018
JP 2021-113040 A 8/2021

*Primary Examiner* — Jason M Han
(74) *Attorney, Agent, or Firm* — POSZ LAW GROUP, PLC

(57) ABSTRACT

A steering device includes a rotary part rotatably attached to a mobile body, and a grip part connected to the rotary part, wherein the rotary part includes a light irradiation part configured to emit light toward at least a portion of the grip part, the light irradiation part includes a light emitting element configured to emit light at an angle range that is determined in advance, and a lens configured to narrow the angle range of the light emitted by the light emitting element, and when an extension direction of the at least the portion of the grip part to which the light is emitted is assumed as a first direction, a direction perpendicular to a direction of an optical axis of the light emitted by the light irradiation part and to the first direction is assumed as a second direction, a plane including the optical axis and the first direction is assumed as a first plane, and a plane including the optical axis and the second direction is assumed as a second plane, the lens narrows the angle range of the light emitted by the light emitting element such that a first angle range is larger than a second angle range, the first angle range being an angle range in the first plane, the second angle range being an angle range in the second plane.

6 Claims, 13 Drawing Sheets

STEERING DEVICE

CROSS REFERENCE TO RELATED APPLICATIONS

The present application claims priority to Japanese Patent Application No. 2022-184535 filed on Nov. 18, 2022 and Japanese Patent Application No. 2023-127679 filed on Aug. 4, 2023, the disclosures of which are incorporated herein by reference in its entirety.

BACKGROUND

Field

The present disclosure relates to a steering device provided to a mobile body.

Related Art

Japanese Patent Laid-Open No. 2018-111440 discloses a steering wheel illumination apparatus that irradiates a steering wheel with visible light by LEDs equipped to a pad part and a spoke part of a steering wheel of a vehicle. The driver visually perceives light with which the steering wheel is irradiated and hence, it is possible to prompt the driver to grip the wheel part of the steering wheel when the vehicle shifts from an automatic operation to a manual operation.

In general, the dimension of a steering device in the front and rear direction of a vehicle is smaller than the dimension of the steering device in the left and right direction of the vehicle. In the technique disclosed in Japanese Patent Laid-Open No. 2018-111440, when a wheel part is irradiated with light by an LED that can illuminate the wheel part in the left and right direction of the vehicle with a certain amount of luminance or more, light that does not impinge on the wheel part passes through areas in front of and behind the wheel part. That is, energy consumed by the LED is not efficiently used to irradiate the wheel part. For this reason, there is a demand for an increase in proportion of light that is incident on a wheel part.

SUMMARY

The present disclosure has been made to solve at least a portion of the above-described problem, and can be achieved by the following aspect.

According to one aspect of the present disclosure, a steering device is provided. This steering device is a steering device provided to a mobile body, the steering device including: a rotary part rotatably attached to the mobile body; and a grip part configured to be gripped by a user, the grip part being connected to the rotary part, wherein the rotary part includes a first light irradiation part configured to emit light toward at least a portion of the grip part, the first light irradiation part includes a light emitting element configured to emit light at an angle range that is determined in advance, and a lens configured to narrow the angle range of the light emitted by the light emitting element, and when an extension direction of the at least the portion of the grip part to which the light is emitted is assumed as a first direction, a direction perpendicular to a direction of an optical axis of the light emitted by the first light irradiation part and to the first direction is assumed as a second direction, a plane including the optical axis and the first direction is assumed as a first plane, and a plane including the optical axis and the second direction is assumed as a second plane, the lens narrows the angle range of the light emitted by the light emitting element such that a first angle range is larger than a second angle range, the first angle range being an angle range of the light emitted by the first light irradiation part in the first plane, the second angle range being an angle range of the light emitted by the first light irradiation part in the second plane.

DETAILED DESCRIPTION

A. First Embodiment

A1. Configuration of First Embodiment

Figure 1:
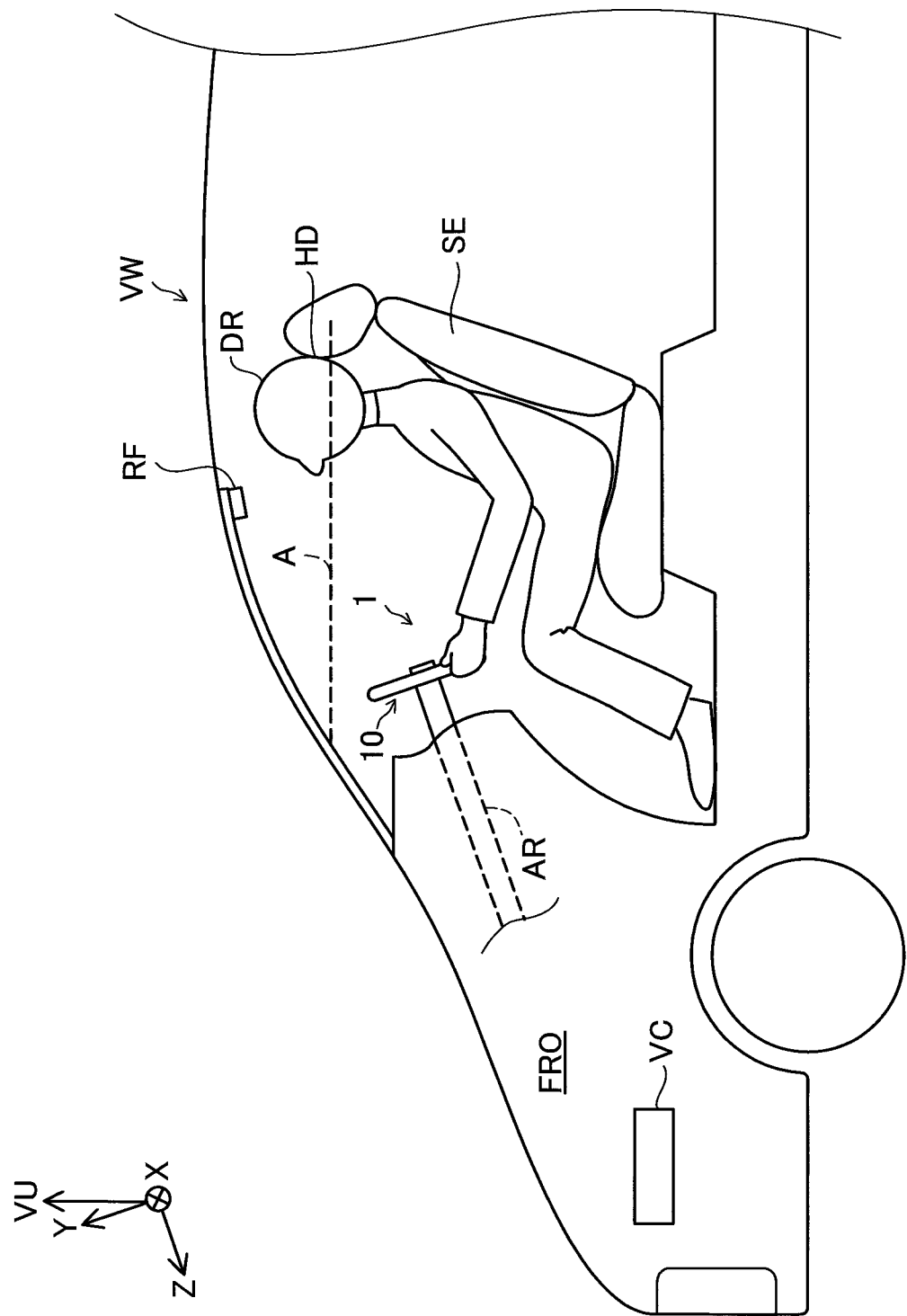
FIG. 1 is an explanatory view showing a vehicle on which a steering device of a first embodiment is mounted.

FIG. 1 is an explanatory view showing a vehicle VW on which a steering device 1 of a first embodiment is mounted. The X axis, the Y axis, and the Z axis orthogonal to each other are shown in FIG. 1. The X axis extends in the left and right direction of the vehicle VW. The direction from the viewer's side toward the back side of the paper surface is the positive direction of the X axis. The Z axis extends in a direction parallel to the extension direction of a rotary shaft AR rotated by the steering device 1 of the first embodiment. The rotary shaft AR will be described later. The Y axis extends in a direction orthogonal to the X axis and the Z axis. The same applies for FIG. 2 to FIG. 4, FIG. 7, FIG. 12, and FIG. 13, which will be described later. In FIG. 1, the direction of the vertical direction is shown by a VU axis. The upward direction along the vertical direction is the positive direction of the VU axis.

The vehicle VW in the present embodiment allows either an automatic operation or a manual operation performed by a driver DR. The vehicle VW includes a range finder RF, a seat SE, a vehicle control unit VC, and the steering device 1. Each of the range finder RF and the steering device 1 is electrically connected to the vehicle control unit VC, and can mutually send/receive signals to/from the vehicle control unit VC.

The range finder RF obtains the distance to the other vehicle located in front of the vehicle VW. The range finder RF transmits, to the vehicle control unit VC, data on the obtained distance. A sonar is used for the range finder RF. A millimeter wave radar or a LIDAR sensor, for example, may be used for the range finder RF.

The seat SE is a part on which the driver DR sits when the driver DR steers the vehicle VW. The seat SE includes a headrest HD. The headrest HD is a part against which the driver DR leans the head. The headrest HD is disposed at the upper portion of the seat SE in the vertical direction.

The vehicle control unit VC calculates the speed of the other vehicle based on the relative moving distance of the other vehicle with respect to the vehicle VW within a predetermined time period. When the speed of the other vehicle becomes higher than a predetermined numerical value, the vehicle control unit VC sends, to a control unit 30, which will be described later, a preceding vehicle start signal, being a signal indicating starting of movement of the other vehicle.

The vehicle control unit VC obtains, through wireless network communication, the section of a road that allows the automatic operation. In the case where the vehicle VW is under the automatic operation, and reaches a point at a predetermined distance away from the section of a road in which the vehicle VW is required to be operated by the driver DR, the vehicle control unit VC sends, to the control unit 30, which will be described later, a manual operation shift signal, being a signal indicating that the vehicle VW should be shifted from the automatic operation to the manual operation.

Figure 2:
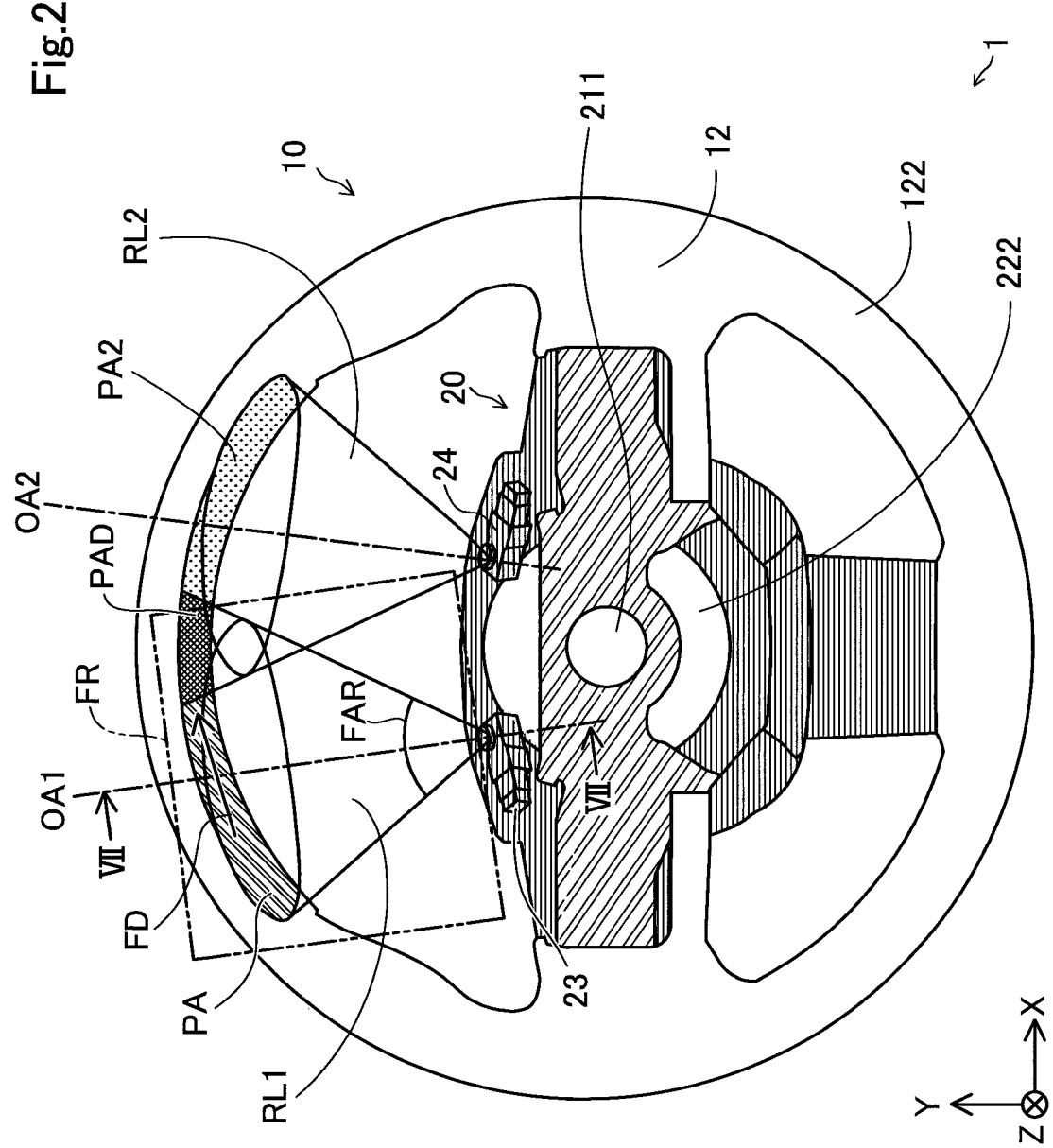
FIG. 2 is an explanatory view showing the steering device.

FIG. 2 is an explanatory view showing the steering device 1. FIG. 2 is a diagram of the steering device 1 shown in FIG. 1, and the steering device 1 is viewed in the positive direction of the Z axis. FIG. 2 is a diagram showing the steering device 1 in a simplified manner. To facilitate understanding, a rotary part 20 is hatched in FIG. 2. The same applies for FIG. 3 and FIG. 4, which will be described later. The steering device 1 is to be gripped by the driver DR, being a user of the vehicle VW (see FIG. 1). The steering device 1 is a device that achieves the steering of the vehicle VW by being manipulated by the driver DR.

As shown in FIG. 1, the steering device 1 is connected to the rotary shaft AR disposed in a front FRO of the vehicle VW (see a broken line portion in FIG. 1). The steering device 1 is attached to the vehicle VW via the rotary shaft AR. The rotary shaft AR transfers rotation to the torque sensor of the vehicle VW, which is not shown in the drawing. The steering device 1 includes a grip part 10 and the rotary part 20, which are shown in FIG. 2, and the control unit 30. Illustration of the control unit 30 is omitted in FIG. 2.

The grip part 10 is a part configured to be gripped by the driver DR. The grip part 10 is formed symmetrically with respect to the rotary part 20. The grip part 10 is connected to the rotary part 20 on the inner peripheral side of the grip part 10. In the present embodiment, the grip part 10 has a substantially annular shape. The grip part 10 is disposed in such a way as to enclose the periphery of the rotary shaft AR when the grip part 10 is viewed in the positive direction of the Z axis. Illustration of the rotary shaft AR is omitted in FIG. 2.

Figure 3:
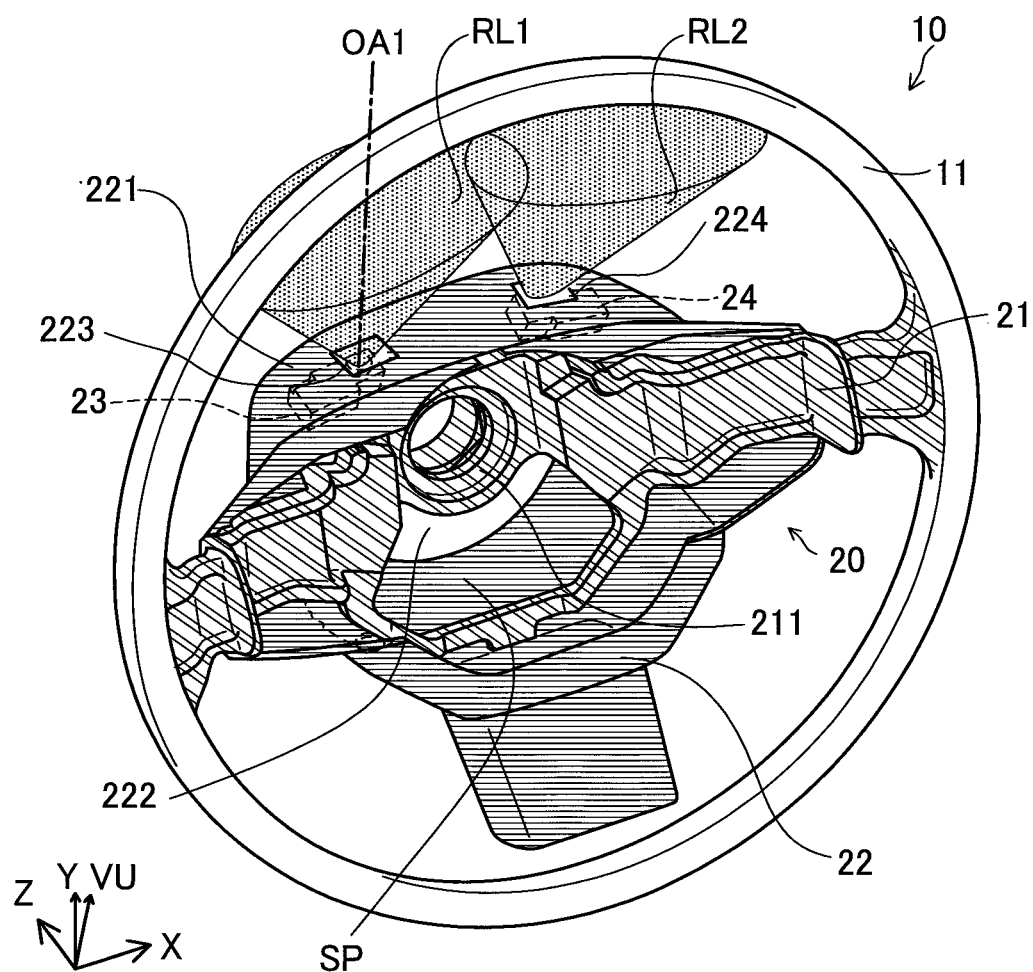
FIG. 3 is a diagram for describing connection between a grip part and a rotary part.

FIG. 3 is a diagram for describing connection between the grip part 10 and the rotary part 20. As shown in FIG. 2 and FIG. 3, the grip part 10 includes a core metal part 11 and a covering part 12. As shown in FIG. 3, the core metal part 11 is a part that is connected to the rotary part 20. The core metal part 11 has an annular shape. The core metal part 11 is formed symmetrically with respect to the rotary part 20. An aluminum alloy is used as the material of the core metal part 11.

The covering part 12 shown in FIG. 2 covers the core metal part 11 to protect the core metal part 11. The covering part 12 also covers portions of the rotary part 20. The covering part 12 includes a first covering part 121 and a second covering part 122. Only the second covering part 122 is illustrated in FIG. 2, and illustration of the first covering part 121 is omitted in FIG. 2. The first covering part 121 covers the core metal part 11. The first covering part 121 also covers portions of the rotary part 20. The first covering part 121 is covered by the second covering part 122. The first covering part 121 is made of a soft synthetic resin. In the present embodiment, foamed polyurethane is used as a synthetic resin. The second covering part 122 covers the first covering part 121. In the present embodiment, leather is used as the material of the second covering part 122.

The rotary part 20 is rotatably attached to the vehicle VW. Specifically, the rotary shaft AR passes through a fixing hole part 211, which will be described later, so that the rotary part 20 is rotatably attached to the vehicle VW. As shown in FIG. 3, the rotary part 20 is connected to the grip part 10. The position of the rotary part 20 at which the symmetry plane of the rotary part 20 includes the VU direction, being the vertical direction, is taken as "reference angle position of the rotary part 20". FIG. 3 shows a state in which the rotary part 20 is in the reference angle position of the rotary part 20. As shown in FIG. 3, in a state in which the rotary part 20 is not rotated by the driver DR, the rotary part 20 is symmetrical with respect to a plane including the Y axis and the Z axis. The rotary part 20 includes a fixing part 21, a pad part 22, a housing space SP, a first light irradiation part 23, and a second light irradiation part 24.

The fixing part 21 is a part that is connected to the grip part 10. The fixing part 21 is configured to allow the rotary shaft AR disposed in the front FRO of the vehicle VW to pass through the fixing hole part 211, being a hole formed at the center of the fixing part 21. Illustration of the rotary shaft AR is omitted in FIG. 3. The fixing part 21 can rotate around the rotary shaft AR.

Figure 4:
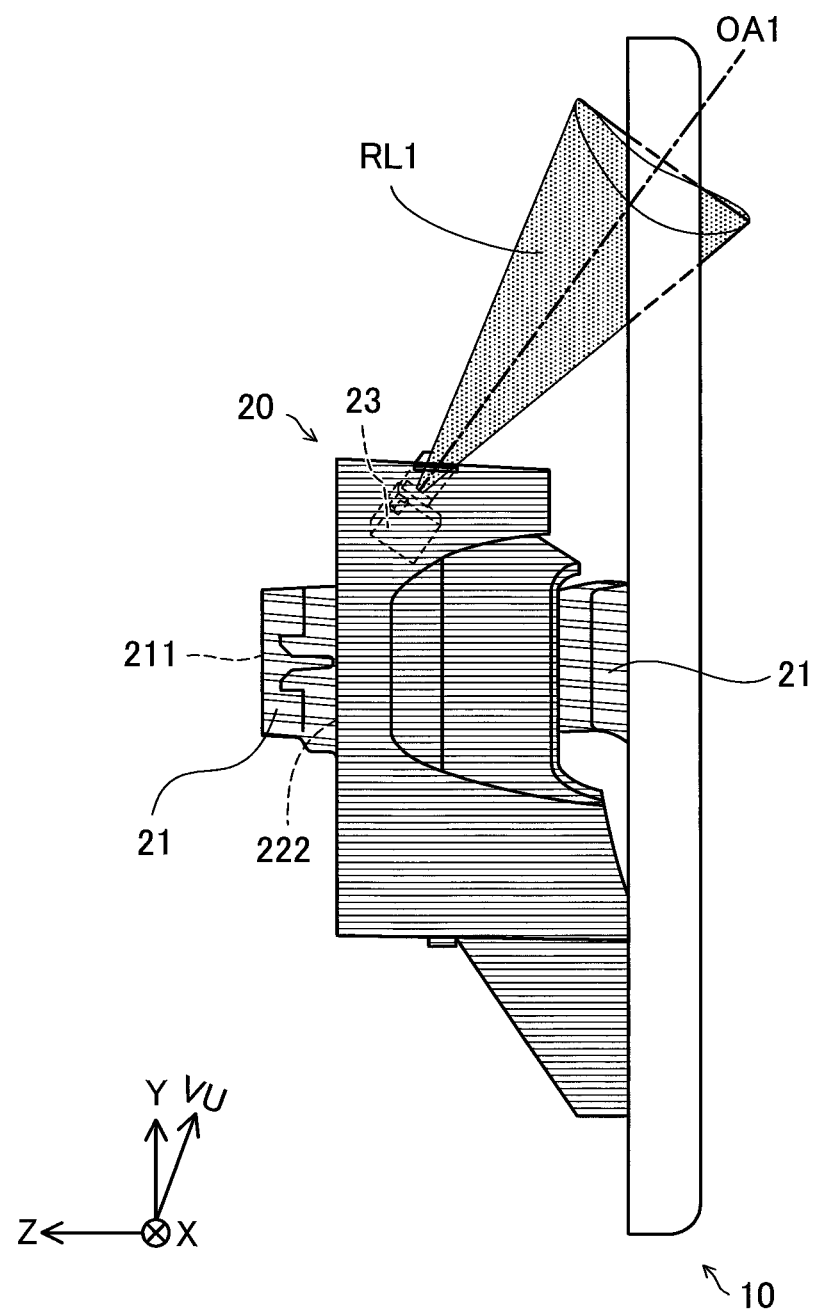
FIG. 4 is a diagram of the steering device shown in FIG. 3, the steering device being viewed in a positive direction of an X axis.

FIG. 4 is a diagram of the steering device 1 shown in FIG. 3, the steering device 1 being viewed in the positive direction of the X axis. In FIG. 4, the shape of the steering device 1 is shown by a straight line. As shown in FIG. 4, the fixing part 21 protrudes in the positive direction of the Z axis, being the direction away from the center of the grip part 10 and the direction away from the driver DR. As shown in FIG. 3, the fixing hole part 211 described above is formed at the center of the fixing part 21. An aluminum alloy is used as the material of the fixing part 21.

The pad part 22 covers a portion of the fixing part 21 to protect the portion of the fixing part 21. The pad part 22 is bonded to the fixing part 21, thus being fixed to the fixing part 21. The pad part 22 includes a pad hole part 222, a first irradiation hole part 223, and a second irradiation hole part 224.

As shown in FIG. 3, the pad hole part 222 is a hole larger than the fixing hole part 211. The pad hole part 222 is formed at the center of the pad part 22. As shown in FIG. 4, a portion of the fixing part 21 that forms the fixing hole part 211 is caused to pass through the pad hole part 222.

The first irradiation hole part 223 shown in FIG. 3 is a hole through which light emitted by the first light irradiation part 23, which will be described later, passes. The second irradiation hole part 224 is a hole through which light emitted by the second light irradiation part 24, which will be described later, passes.

The housing space SP is a space formed inside the pad part 22. An airbag and an inflator not shown in the drawing are housed in the housing space SP. The first light irradiation part 23 and the second light irradiation part 24 are also housed in the housing space SP. Although not shown in the drawings, the steering device 1 is provided with a cover that covers the housing space SP. With such a configuration, it is possible to protect components housed in the housing space SP from impact from the outside.

As shown in FIG. 2 and FIG. 3, the first light irradiation part 23 emits light RL1 toward the grip part 10. A portion of the light RL1 is shown in FIG. 2 and FIG. 3. The light RL1 is hatched in FIG. 3. The same applies for FIG. 4. As shown in FIG. 3, the first light irradiation part 23 is configured to, when the rotary part 20 is in the reference angle position, irradiate, with light, the portion of the grip part 10 that is located above the rotary part 20 in the VU direction, being the vertical direction. In this specification, the description "an area above the rotary part 20 in the vertical direction" refers to the area disposed at a position higher in the vertical direction than the area occupied by the rotary part 20. The description that a certain article A "is located above the rotary part 20 in the vertical direction" does not mean that the certain article A is located directly above the rotary part 20 in the vertical direction. That is, when the article A is projected in the vertical direction, the position of the article A in the horizontal direction need not overlap with the rotary part 20. In the same manner, in this specification, the description "an area below the rotary part 20 in the vertical direction" refers to the area disposed at a position lower in the vertical direction than the area occupied by the rotary part 20. The description that a certain article A "is located below the rotary part 20 in the vertical direction" does not mean that the certain article A is located directly below the rotary part 20 in the vertical direction. That is, when the article A is projected in the vertical direction, the position of the article A in the horizontal direction need not overlap with the rotary part 20.

In the present embodiment, in order to prevent the grip part 10 from interrupting the line of sight of the driver DR, the steering device 1 is disposed such that the upper end portion of the grip part 10 in the vertical direction is located below a line in the vertical direction, the line passing through the center of the headrest HD and extending in the direction perpendicular to the vertical direction (see a broken line A in FIG. 1). Therefore, the driver DR can visually perceive the upper portion of the grip part 10 in the vertical direction more easily than the lower portion of the grip part 10 in the vertical direction. In the present embodiment, when the rotary part 20 is in the reference angle position, the portion of the grip part 10 that is located above the rotary part 20 in the vertical direction is irradiated with light. Accordingly, compared with a mode in which the portion of the grip part 10 that is located below the rotary part 20 in the vertical direction is irradiated with light, the driver DR can more easily visually perceive light that is reflected off the grip part 10.

As shown in FIG. 3, an optical axis OA1 of the first light irradiation part 23 passes through the grip part 10. In the present embodiment, the light RL1 emitted by the first light irradiation part 23 has an intensity distribution in which an angle position farther from the optical axis OA1 has a lower intensity. The angle position of light refers to the angle of the light from the optical axis OA1 in a plane including the optical axis OA1 and a certain direction perpendicular to the optical axis OA1. The intensity distribution will be described later.

As shown in FIG. 1 and FIG. 2, in the present embodiment, the first light irradiation part 23 is configured to, when the rotary part 20 is in the reference angle position, cause a predetermined proportion or more of irradiated light to be incident on the portion of the grip part 10 that is within the upper half area in the Y axis direction and that faces the headrest HD (see portions indicated by reference symbols PA and PAD in FIG. 2). The predetermined proportion refers to the proportion of a quantity of light that is sufficiently visually perceived by the driver DR during manipulation of the steering device 1 assuming that a quantity of light emitted from the first light irradiation part 23 is taken as 100%. The predetermined proportion is determined by the manufacturer of the vehicle VW. In this mode, it is possible to cause light at a predetermined proportion to be incident on a portion that is easily visually perceived by the driver DR during manipulation of the steering device 1. As shown in FIG. 3, the first light irradiation part 23 is disposed at an upper end 221 of the pad part 22. The first light irradiation part 23 is disposed in the housing space SP. The first light irradiation part 23 is disposed in the housing space SP, thus allowing the driver DR to easily visually perceive meters, a windshield, and the like in the vehicle VW.

Figure 5:
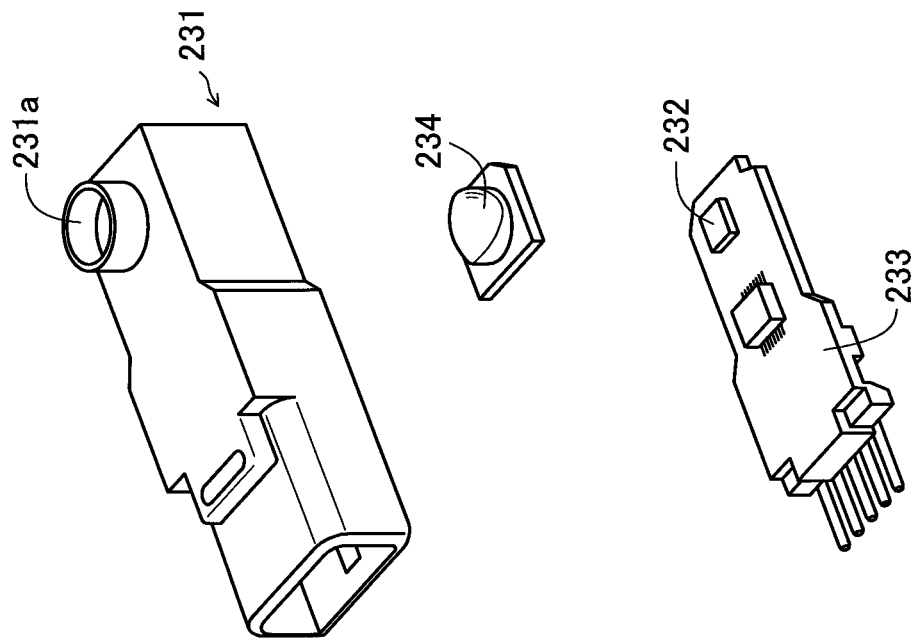
FIG. 5 is an explanatory view showing a configuration of a first light irradiation part.

FIG. 5 is an explanatory view showing the configuration of the first light irradiation part 23. The first light irradiation part 23 has a substantially rectangular shape. The first light irradiation part 23 includes a casing 231, a light emitting element 232, a light source substrate 233, and a lens 234.

The casing 231 is a member that houses the light emitting element 232, the light source substrate 233, and the lens 234. The external appearance of the casing 231 has a substantially rectangular shape. A silicone resin is used as the material of the casing 231. The casing 231 includes a casing hole part 231a. The casing hole part 231a is a hole through which light passes that is emitted by the light emitting element 232 and that transmits through the lens 234.

The light emitting element 232 emits light at an angle range that is determined in advance. The angle range in this specification refers to the angle range of light that passes through a certain plane including the optical axis OA1. In the present embodiment, the light emitting element 232 emits light at an angle range that extends by 30 degrees in each of the left and right directions in the certain plane, the optical axis OA1 being used as the center of the angle range. The angle of light is not exactly shown in FIG. 2 and FIG. 3, and in FIG. 11, which will be described later. In the present embodiment, a light emitting diode is used as the light emitting element 232. The light emitting element 232 is disposed on the light source substrate 233. The light source substrate 233 is a printed circuit board. The light source substrate 233 has a substantially rectangular shape.

Figure 6:
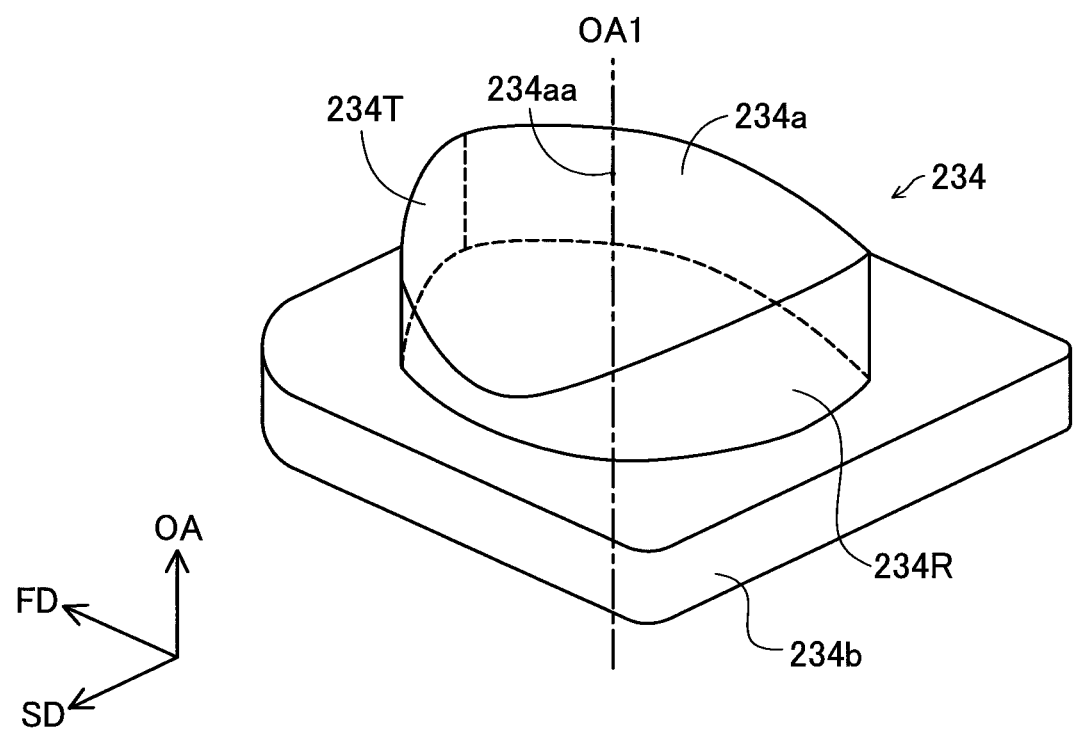
FIG. 6 is an explanatory view showing a lens in the first embodiment.
Figure 7:
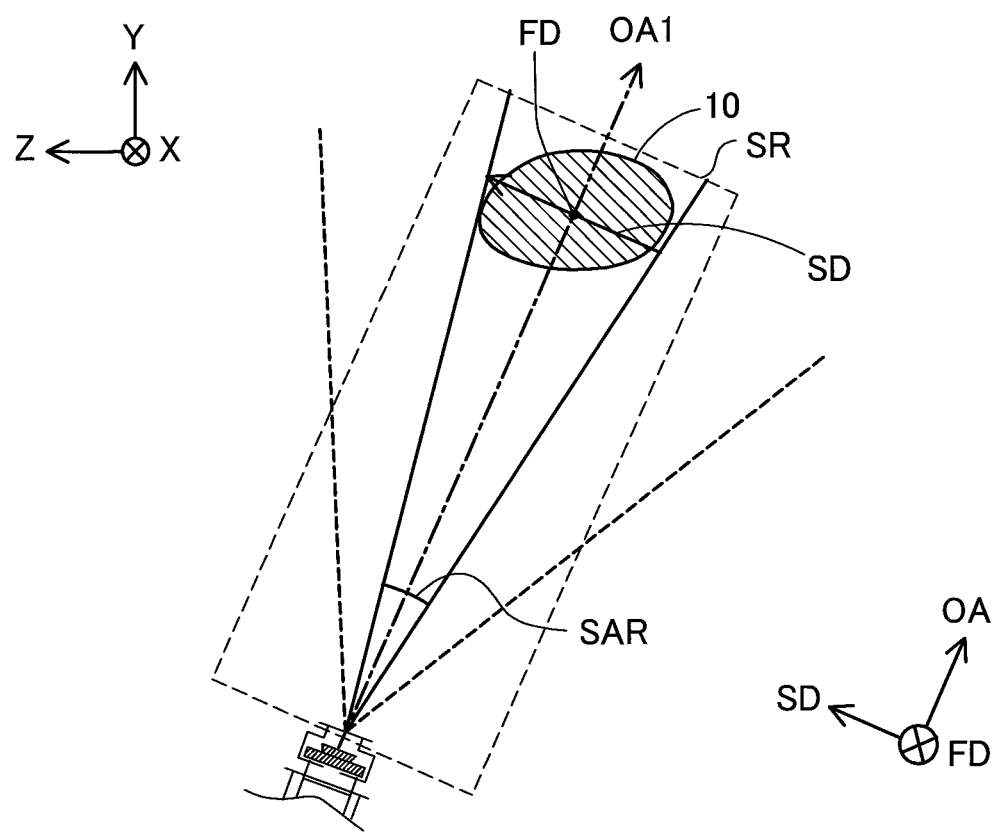
FIG. 7 is a diagram showing a portion of a cross section taken along VII-VII in FIG. 2.

FIG. 6 is an explanatory view showing the lens 234 in the first embodiment. FIG. 7 is a diagram showing a portion of a cross section taken along VII-VII in FIG. 2. The shape of the cross section of the grip part 10 is not exactly shown in FIG. 7. Prior to the description of the lens 234, a plane including the optical axis OA1 and the direction perpendicular to the optical axis OA1 will be described. As shown in FIG. 2, the extension direction of the portion of the grip part 10 is referred to as "first direction FD", light being emitted to the portion of the grip part 10. In the present embodiment, the first direction FD is the direction perpendicular to the optical axis OA1. The plane including the optical axis OA1 of light emitted by the first light irradiation part 23 and the first direction FD is referred to as "first plane FR". In FIG. 2, a portion of the first plane FR is indicated by a frame shown by a broken line.

As shown in FIG. 7, assume that the direction perpendicular to the direction of the optical axis OA1 and the first direction FD is a second direction SD. The plane including the optical axis OA1 and the second direction SD is referred to as "second plane SR". In FIG. 7, a portion of the second plane SR is indicated by a frame. Hereinafter, the direction of the optical axis OA1 toward the grip part 10 is referred to as "the positive direction of the optical axis OA1", and the opposite direction is referred to as "the negative direction of the optical axis OA1". The direction along the first direction FD toward the right side of the vehicle VW is described as "the positive direction along the first direction FD", and the opposite direction is described as "the negative direction along the first direction FD". The direction along the second direction SD toward the front side of the vehicle VW is described as "the positive direction along the second direction SD", and the opposite direction is described as "the negative direction along the second direction SD".

The lens 234 shown in FIG. 6 allows transmission of light emitted by the light emitting element 232. In the present embodiment, the lens 234 narrows the angle range of light emitted by the light emitting element 232. The lens 234 includes a lens part 234a and a pedestal 234b.

The lens part 234a is a part through which light emitted by the light emitting element 232 transmits. The lens part 234a is connected to the pedestal 234b. The lens part 234a has a shape that protrudes in the positive direction of the optical axis OA1 from the end portion of the lens part 234a that is connected to the pedestal 234b. The surface of the lens part 234a that is connected to the pedestal 234b is a flat surface perpendicular to the optical axis OA1. The lens part 234a has a curved surface formed to extend in the negative direction of the optical axis OA1 from a vertex 234aa of the lens part 234a. The curved surface that expands in both directions along the first direction FD from the vertex 234aa of the lens part 234a forms a curved surface with a smaller curvature than a curved surface that expands in both directions along the second direction SD. The lens part 234a has a circular shape when viewed from the positive direction of the optical axis OA1. An acrylic resin is used as the material of the lens part 234a. The lens part 234a has a transmission surface 234T and a reflection surface 234R.

The transmission surface 234T is a part through which light emitted by the light emitting element 232 transmits. The transmission surface 234T forms the curved surface of the lens part 234a. Of the surfaces of the lens part 234a, the transmission surface 234T is a surface that expands in the direction perpendicular to the optical axis OA1. The reflection surface 234R reflects light that is emitted from the light emitting element 232 and that is incident on the lens part 234a, thus narrowing the angle range of light that advances in the first direction FD and the second direction SD. The reflection surface 234R is a part of the lens part 234a that excludes the transmission surface 234T. Of the surfaces of the lens part 234a, the reflection surface 234R is a surface that expands in the direction parallel to the optical axis OA1. The reflection surface 234R forms the side surface of the lens part 234a.

In general, it is known that light has the property of reflecting instead of transmitting in the case where the light is incident on the flat surface of a transparent object at a particular angle or more. The reflection surface 234R is formed in the lens part 234a in such a way as to cause total reflection of light emitted from the light emitting element 232.

The pedestal 234b is a part that fixes the lens part 234a in the casing 231. The pedestal 234b is connected to the lens part 234a.

The second light irradiation part 24 shown in FIG. 3 has the same configuration as the first light irradiation part 23. The second light irradiation part 24 is disposed at the upper end 221 of the pad part 22. The second light irradiation part 24 is disposed side by side with the first light irradiation part 23 in the X axis direction in the housing space SP. The second light irradiation part 24 is disposed in such a way as to be symmetrical to the first light irradiation part 23 with respect to the plane including the Y axis and the Z axis. As shown in FIG. 2, the second light irradiation part 24 is configured such that a portion of light RL2 emitted by the second light irradiation part 24 and a portion of the light RL1 emitted by the first light irradiation part 23 overlap with each other. The portion of the grip part 10 on which overlapping light impinges is referred to as "overlapping portion PAD". A portion of light emitted refers to the portion including an angle position farthest from the optical axis OA1 of the first light irradiation part 23 or an optical axis OA2 of the second light irradiation part 24. The second light irradiation part 24 is configured such that, when the rotary part 20 is at a reference angle as shown in FIG. 2, overlapping light impinges on the portion of the grip part 10 that is located above the rotary part 20 in the vertical direction (see FIG. 2 and FIG. 3).

Figure 8:
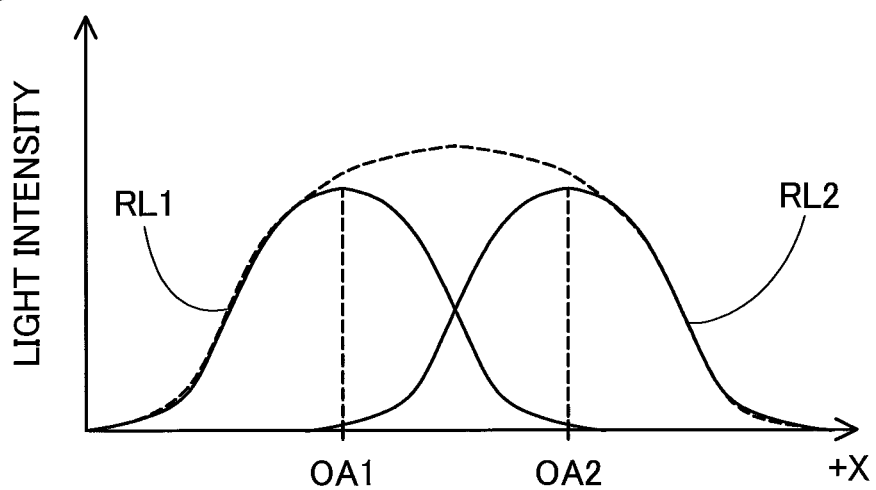
FIG. 8 is a diagram for describing an intensity distribution.

FIG. 8 is a diagram for describing an intensity distribution. FIG. 8 is a diagram showing distribution of light intensity when the grip part 10 is viewed from the position of FIG. 2, and +X on the horizontal axis corresponds to the positive direction of the X axis shown in FIG. 2. As described above, in the present embodiment, the light RL1 emitted by the first light irradiation part 23 has a lower intensity at an angle position farther from the optical axis OA1. The same applies for the light RL2 from the second light irradiation part 24. That is, light from the first light irradiation part 23 has a higher light intensity at an angle position closer to the optical axis OA1, and has a lower light intensity as the light becomes more distant from the optical axis OA1. Light from the second light irradiation part 24 has a higher light intensity at an angle position closer to the optical axis OA2, and has a lower light intensity as the light becomes more distant from the optical axis OA2.

As shown by solid lines in FIG. 8, as the light RL1 from the first light irradiation part 23 becomes more distant from the optical axis OA1 of the first light irradiation part 23, the intensity of the light RL1 decreases, and as the light RL2 from the second light irradiation part 24 becomes more distant from the optical axis OA2 of the second light irradiation part 24, the intensity of the light RL2 decreases. In contrast, as shown by a broken line in FIG. 8, at a portion at which the light RL1 and the light RL2 overlap with each other, light intensity is increased compared with the intensity of the light RL1 by itself or the intensity of the light RL2 by itself.

The portion including the angle position farthest from the optical axis OA1 of the first light irradiation part 23 overlaps with the portion including the angle position farthest from the optical axis OA2 of the second light irradiation part 24, so that decreased light intensities are reinforced. An angle range closer to the optical axis OA1 or OA2 has a higher intensity and hence, light intensity increases from the overlapping portion PAD toward the optical axis OA1 or the optical axis OA2, or a light intensity substantially equal to a light intensity at the overlapping portion PAD is achieved within the range from the overlapping portion PAD to the optical axis OA1 or the optical axis OA2. Therefore, when the driver DR looks at the grip part 10, the portion of the grip part 10 is seen uniformly shining (see reference symbols PA, PAD, PA2 in FIG. 2).

As described above, the overlapping portion PAD is located above the rotary part 20 in the vertical direction and hence, it is possible to increase the light intensity at the portion of the grip part 10 that is easily visually perceived by the driver DR compared with a mode including no overlapping portion PAD. In the present embodiment, at the angle position distant from the optical axis OA1, portions that are irradiated with light overlap with each other in this manner and hence, the light can be easily visually perceived by the driver DR. Further, the overlapping portion is located at the uppermost portion of the grip part 10 in the vertical direction and hence, the light is more easily visually perceived by the driver DR.

Figure 9:
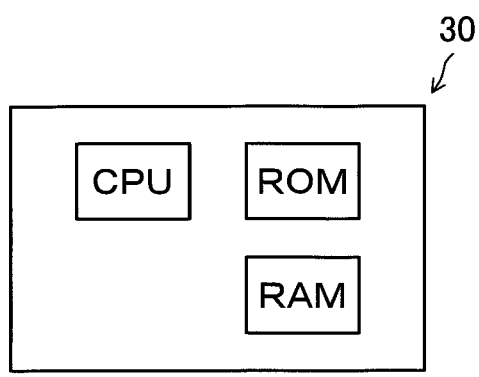
FIG. 9 is an explanatory view showing a control unit.

FIG. 9 is an explanatory view showing the control unit 30. The control unit 30 includes a CPU, being a processor, a ROM, and a RAM. The CPU develops a program, stored in the ROM, on the RAM to achieve the following functions.

The control unit 30 controls the first light irradiation part 23 and the second light irradiation part 24. Specifically, the control unit 30 controls timing at which each of the first light irradiation part 23 and the second light irradiation part 24 emits light. The control unit 30 receives a preceding vehicle start signal and a manual operation shift signal from the vehicle control unit VC. When the control unit 30 receives the preceding vehicle start signal from the vehicle control unit VC, the control unit 30 controls the first light irradiation part 23 and the second light irradiation part 24 such that the first light irradiation part 23 and the second light irradiation part 24 emit light simultaneously. The control unit 30 causes the first light irradiation part 23 and the second light irradiation part 24 to emit light for a predetermined time period. This causes the driver DR receiving reflected light from the grip part 10 to look in front of the vehicle VW, thus causing the driver DR to notice starting of movement of the preceding vehicle. After notification by light starts, the driver DR is notified of the starting of movement of the vehicle VW located in front of the vehicle VW by voice from a speaker in the vehicle VW not shown in the drawing.

In the present embodiment, when the control unit 30 receives a manual operation shift signal, the control unit 30 controls the first light irradiation part 23 and the second light irradiation part 24 such that the first light irradiation part 23 and the second light irradiation part 24 alternately emit light.

As described above, a manual operation shift signal is sent to the control unit 30 in the case where it is necessary for the vehicle VW to be operated by the driver DR. In this case, it is considered that the urgency for being noticed by the driver DR is higher than in the case where the preceding vehicle starts movement. By causing the first light irradiation part 23 and the second light irradiation part 24 to alternately perform irradiation of light, it is possible to achieve alternate blinking at the grip part 10. With such a configuration, even in a state in which the driver DR is paying no attention to light at the grip part 10, it is possible to cause the driver DR to easily notice the light. After notification by light starts, the driver DR is notified of the fact that the vehicle VW is required to be operated by the driver DR by voice from a speaker in the vehicle VW not shown in the drawing.

A2. Effect of Narrowing Angle Range of Light by Lens 234

In general, it is known that the light emitting element has the property of emitting light in a conical shape about the optical axis. Therefore, in the case where the lens part has the same curvature in the first direction and the second direction, light emitted from the light emitting element transmits through the lens part in a circular shape about the optical axis. As described above, the steering device 1 is an annular member that is to be gripped by the driver DR and hence, in the mode in which light is emitted in a circular shape about the optical axis OA1, the proportion of light that passes through the area around the grip part 10 is large in the Z axis direction when the steering device 1 is viewed in the direction of the X axis (see broken lines in FIG. 7).

In the present embodiment, as described above, the curvature of the lens part 234a in the second direction SD is larger than the curvature of the lens part 234a in the first direction FD (see FIG. 6). Therefore, as shown in FIG. 2 and FIG. 7, of an angle range of light emitted from the light emitting element 232, a first angle range FAR is larger than a second angle range SAR, the first angle range FAR being an angle range on the first plane FR. The first angle range FAR refers to the range in which a quantity of light is 10% or more of a quantity of light at peak on a straight line on which a plane perpendicular to the optical axis OA1 intersects with the first plane FR. The second angle range SAR refers to the range in which a quantity of light is 10% or more of a quantity of light at peak on a straight line on which a plane perpendicular to the optical axis OA1 intersects with the second plane SR.

With such a configuration, in the present embodiment, compared with a mode in which the first angle range FAR is equal to the second angle range SAR or a mode in which the first angle range FAR is smaller than the second angle range SAR, it is possible to increase the proportion of light RL1 that impinges on the grip part 10, the light RL1 being emitted from the first light irradiation part 23.

In the present embodiment, the reflection surface 234R shown in FIG. 6 reflects light that is emitted from the light emitting element 232 and that impinges on the reflection surface 234R. This allows a configuration in which light falls within a predetermined area of the grip part 10 on the X axis (see PA and PAD in FIG. 2). That is, by narrowing the first angle range FAR, the area of light that expands on the X axis is narrowed compared with a mode in which the reflection surface 234R is not formed. This can further increase light intensity at an upper portion in the vertical direction that can be easily visually perceived by the driver DR compared with a mode in which the reflection surface 234R is not formed.

B. Second Embodiment

Figure 10:
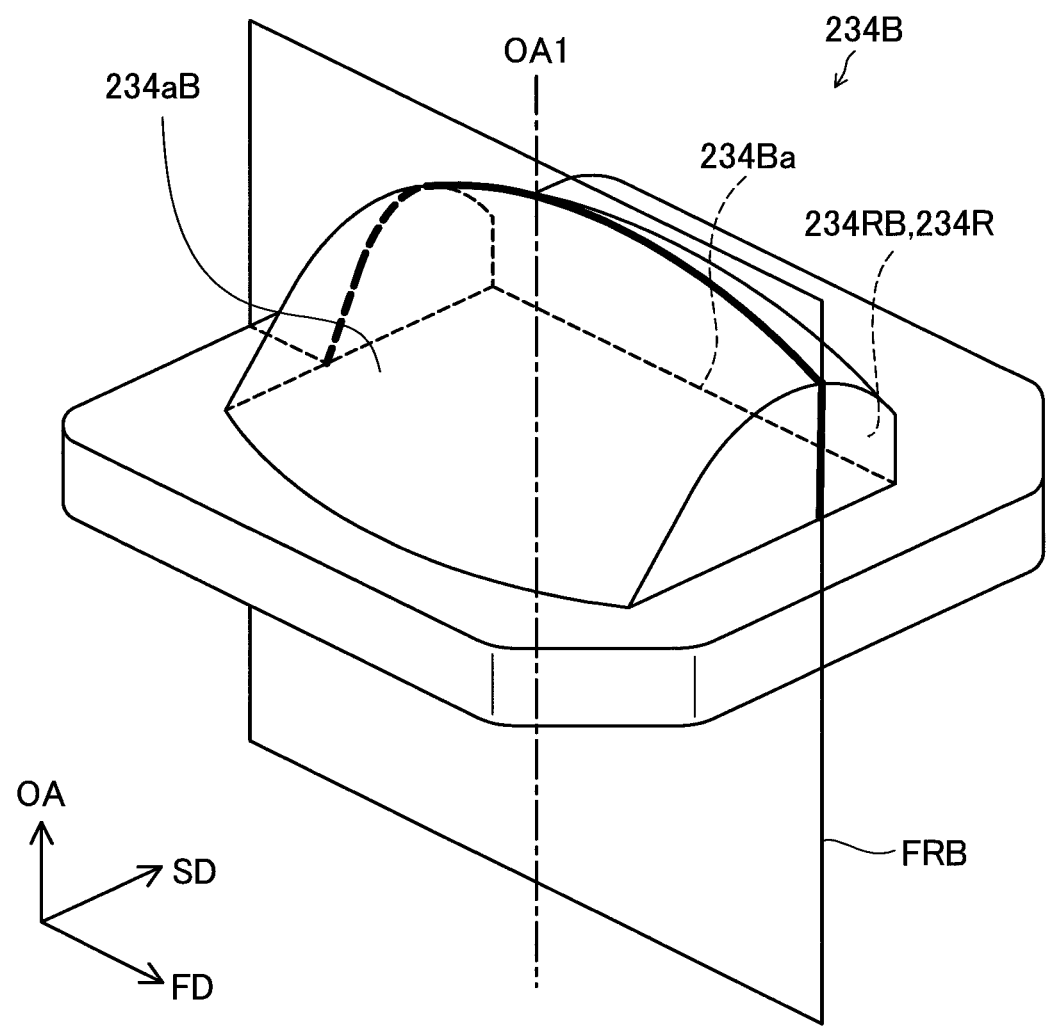
FIG. 10 is a diagram for describing a lens in a second embodiment.

FIG. 10 is a diagram for describing a lens 234B in a second embodiment. In FIG. 10, a border line on which the surface of a lens part 234aB intersects with a first plane FRB is shown by a bold line. The second embodiment differs from the first embodiment in the shape of the lens 234B. Components other than the lens 234B are substantially equal to the corresponding components in the first embodiment and hence, the same reference symbols are given and the detailed description of such components will be omitted.

As shown in FIG. 10, the lens part 234aB in the second embodiment is asymmetrical with respect to the first plane FRB. Of two end portions of the lens part 234aB that face each other in the second direction SD, only one end portion 234Ba has a reflection surface 234R. Specifically, the reflection surface 234R is formed at the end portion 234Ba of the lens 234B that is disposed at a position close to the front FRO of the vehicle VW. The front FRO side of the vehicle VW is the side in the positive direction along the second direction SD. The reflection surface 234R formed along the second direction SD is referred to as "second reflection surface 234RB".

The second reflection surface 234RB reflects light incident on the lens 234B, thus defining one end of an angle range of light on the front FRO side, being the front side of the vehicle VW. One end on the front FRO side is a portion that includes all directions, that is, the direction of the optical axis OA1, the first direction FD, and the second direction SD.

Figure 11:
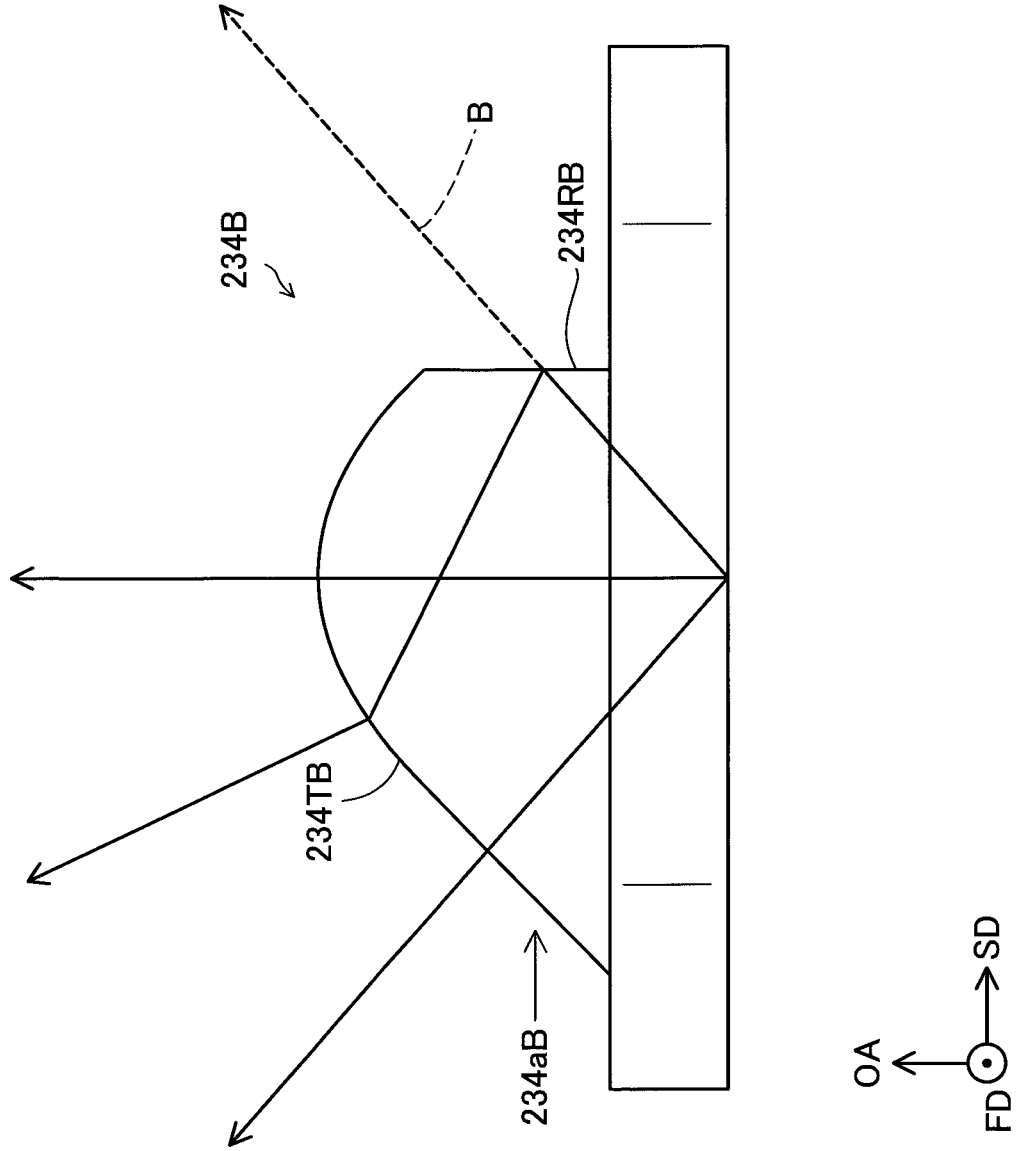
FIG. 11 is a diagram of the lens in the second embodiment, the lens being viewed in the negative direction along a first direction.
Figure 12:
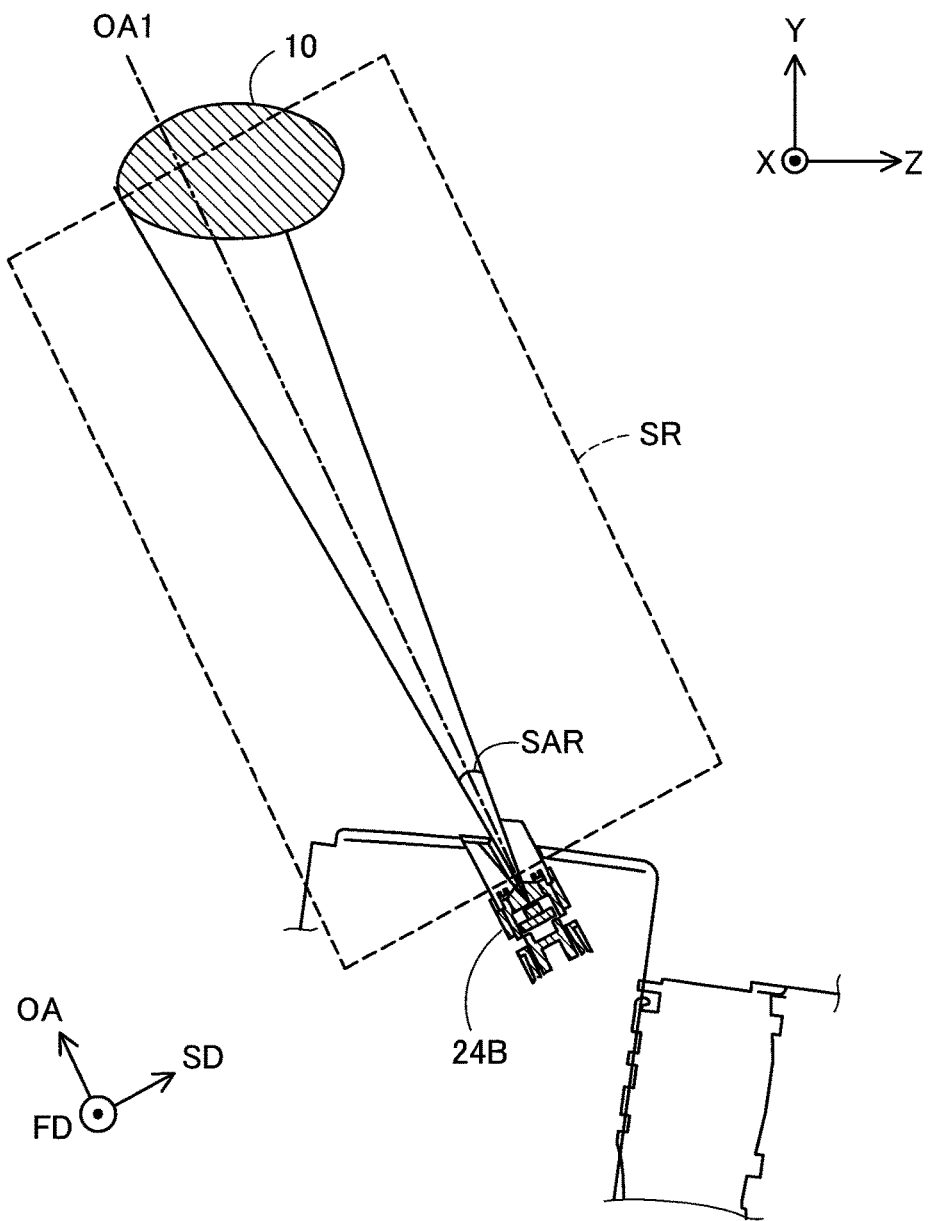
FIG. 12 is a diagram showing a state in which light from a second light irradiation part in the second embodiment impinges on a grip part.

FIG. 11 is a diagram of the lens 234B in the second embodiment, the lens 234B being viewed in the negative direction along the first direction FD. In FIG. 11, directions along which light advances are shown by solid lines. FIG. 12 is a diagram showing a state in which light from a second light irradiation part 24B in the second embodiment impinges on a grip part 10. The shape of the grip part 10 is not exactly shown in FIG. 12. As shown in FIG. 11 and FIG. 12, of light emitted at the second angle range SAR in the second plane SR, light at the end on the front FRO side is reflected off the second reflection surface 234RB. As shown in FIG. 11, light that is reflected off the second reflection surface 234RB passes through a transmission surface 234TB of the lens part 234aB. As shown in FIG. 11 and FIG. 12, light that transmits through the lens part 234aB impinges on the grip part 10. In the second embodiment, the lens part 234aB is configured such that all of the light emitted at the second angle range SAR impinges on the grip part 10. In a mode in which the second reflection surface 234RB is not formed, light transmits toward the front FRO as shown by a broken line arrow B in FIG. 11. The same applies for a first light irradiation part 23B.

In the second embodiment, of light emitted at the second angle range SAR, light at the front end impinges on the grip part 10 without passing around the grip part 10. Therefore, it is possible to further increase the proportion of light that impinges on the grip part 10, the light being emitted at the second angle range SAR. Light is reflected off the second reflection surface 234RB and hence, it is also possible to prevent a situation in which light that is emitted from the light emitting element 232, that passes around the grip part 10, and that is reflected off the windshield of the vehicle VW enters the eye of the driver DR, thus making the steering of the vehicle VW difficult.

C. Third Embodiment

Figure 13:
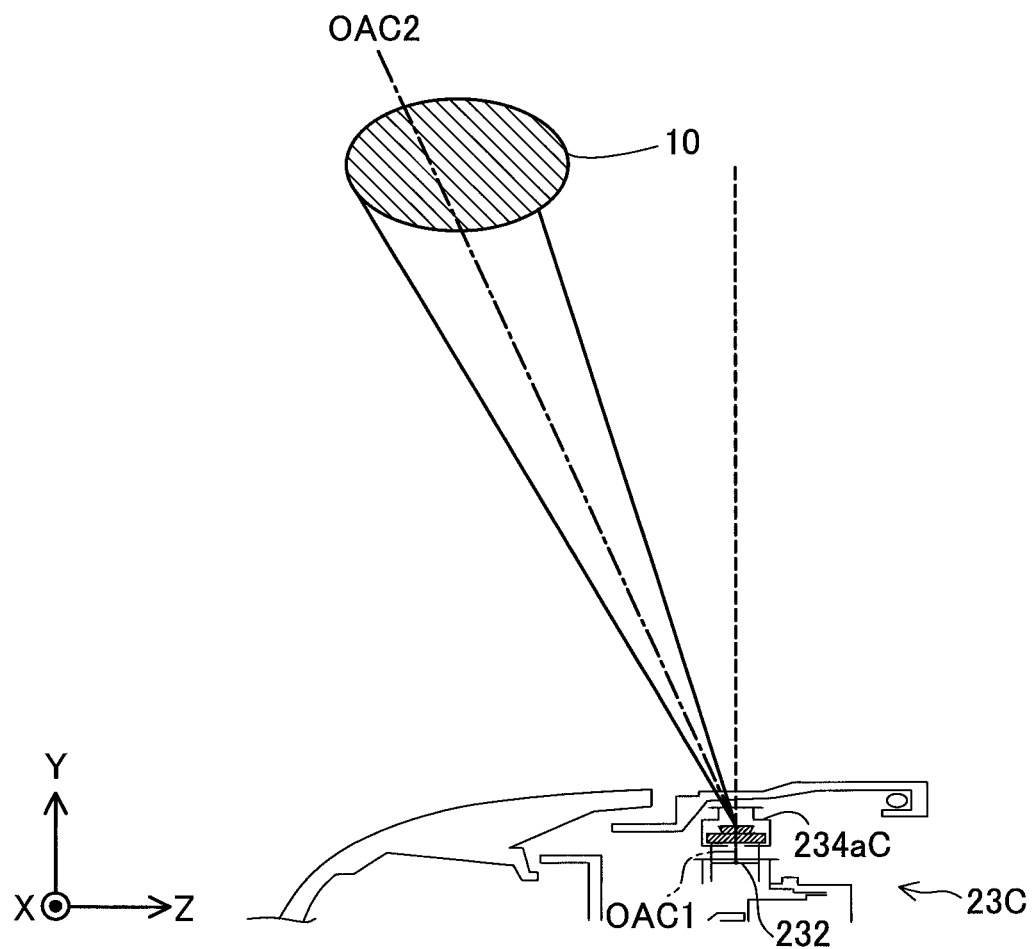
FIG. 13 is a diagram for describing arrangement of a first light irradiation part in a third embodiment.

FIG. 13 is a diagram for describing arrangement of a first light irradiation part 23C in a third embodiment. The third embodiment differs from the first embodiment and the second embodiment in the configuration of a lens part 234aC and in the arrangement of the first light irradiation part 23C. Components other than the lens part 234aC and the first light irradiation part 23C are substantially equal to the corresponding components in the first embodiment and the second embodiment and hence, the same reference symbols are given and the detailed description of such components will be omitted.

The third embodiment differs from the first embodiment and the second embodiment in the direction of an optical axis OAC1 of light that is emitted from the light emitting element 232 and that reaches the lens part 234aC. As shown in FIG. 7 and FIG. 12, in the first embodiment and the second embodiment, the first light irradiation part 23 is disposed such that the optical axis OA1 of light emitted from the light emitting element 232 of the first light irradiation part 23 advances obliquely with respect to the Y axis direction, and is incident on the grip part 10. In the first embodiment and the second embodiment, light that passes along the optical axis OA1 of the first light irradiation part 23 is emitted from the light emitting element 232, passes through the transmission surface 234T or 234TB, advances without any change, and is then incident on the grip part 10 (see FIG. 6 and FIG. 11).

In the third embodiment, the lens part 234aC is configured to allow emission of light after changing, to the direction toward the grip part 10, the direction of the optical axis OAC1 of the light that is emitted from the light emitting element 232 and that is incident on the lens part 234aC. As shown in FIG. 13, the first light irradiation part 23C in the third embodiment is disposed such that the optical axis OAC1 of light emitted from the light emitting element 232 is, first, parallel to the Y axis direction (see OAC1 in FIG. 13). In FIG. 13, the extension of the optical axis OAC1 is shown by a broken line. The lens part 234aC is configured to, when light advancing along the optical axis OAC1 is incident on the lens part 234aC, allow the light to advance obliquely with respect to the Y axis direction (optical axis OAC2 in FIG. 13). The same applies for a second light irradiation part 24C. Illustration of the second light irradiation part 24C in the third embodiment is omitted.

In the third embodiment, even in the case where the first light irradiation part 23C is disposed such that the direction of the optical axis OAC1 of light emitted by the first light irradiation part 23C is different from the direction toward the grip part 10, it is possible to cause the light to be incident on the grip part 10. Accordingly, it is possible to increase the degree of freedom in arrangement of the first light irradiation part 23C and the second light irradiation part 24C in the vehicle VW.

D. Another Embodiment

D1. Another Embodiment 1

(1) In the above-mentioned embodiments, the steering device 1 is mounted on the vehicle VW. The steering device may be provided to a mobile body other than a vehicle, such as a ship or an airplane, for example.

(2) In the above-mentioned embodiments, the first light irradiation part 23 emits the light RL1 toward a portion of the grip part 10. The first light irradiation part may emit light toward the entire grip part. Light is emitted from the first light irradiation part toward at least a portion of the grip part.

(3) In the above-mentioned embodiments, the first light irradiation part 23 and the second light irradiation part 24 are housed in the housing space SP. When the rotary part is in the reference angle position, for example, the first light irradiation part may be disposed above the pad part in the vertical direction. In the above-mentioned embodiments, the second light irradiation part is disposed side by side with the first light irradiation part in the X axis direction in the housing space. The first light irradiation part and the second light irradiation part may be disposed side by side with each other in the Y axis direction, for example.

(4) In the above-mentioned embodiments, the grip part 10 has a substantially annular shape. The grip part may have, for example, a substantially rectangular shape that encloses the periphery of the rotary part. The grip part may have a shape in which, when the rotary part is in the reference angle position, a plurality of rod-like members are connected to each other on the left and right of the rotary part and below the rotary part in the vertical direction. The grip part may be formed of two rod-like members that are disposed on both the left and right of the rotary part when the rotary part is in the reference angle position. In the above-mentioned embodiments, the grip part 10 is formed symmetrically with respect to the rotary part 20. For example, the grip portions do not need to be configured symmetrically across the rotating portion.

(5) In the above-mentioned embodiments, the light emitting diode is used as the light emitting element 232. A laser diode, for example, may be used as the light emitting element.

(6) In the above-mentioned embodiments, an aluminum alloy is used as the material of the core metal part 11. Stainless steel, a magnesium alloy, or the like, for example, may be used as the material of the core metal part.

(7) In the above-mentioned embodiments, foamed polyurethane is used as the material of the first covering part 121. A soft material other than foamed polyurethane may be used.

(8) In the above-mentioned embodiments, leather is used as the material of the second covering part 122. A resin, for example, may be used as the material of the second covering part.

(9) In the above-mentioned embodiments, an aluminum alloy is used as the material of the fixing part 21. Stainless steel, a magnesium alloy, or the like may be used as the material of the fixing part.

(10) In the above-mentioned embodiments, a silicone resin is used as the material of the casing 231. A material other than a silicone resin, such as polyurethane or polycarbonate, for example, may be used as the material of the casing.

(11) In the above-mentioned embodiments, an acrylic resin is used as the material of the lens part 234a. Glass may be used as the material of the lens part.

(12) In the above-mentioned embodiments, the first light irradiation part 23 is configured to, when the rotary part 20 is in the reference angle position, cause a predetermined proportion or more of irradiated light to be incident on the portion of the grip part 10 that is within the upper half area in the Y axis direction and that faces the headrest HD. For example, the first light irradiation part may be configured to cause all of the light emitted by the first light irradiation part to be incident on a portion of the grip part that faces the headrest. Alternatively, less than a predetermined proportion of light emitted by the first light irradiation part may be incident on the portion of the grip part that faces the headrest.

D2. Another Embodiment 2

In the above-mentioned second embodiment, the lens part 234aB defines one end of the angle range of light on the front FRO side, being the front side of the vehicle VW. The lens part may define one end of the angle range of light on the driver side, for example.

D3. Another Embodiment 3

In the above-mentioned third embodiment, the first light irradiation part 23 is disposed such that the optical axis OAC1 of light emitted from the light emitting element 232 is, first, parallel to the Y axis direction. The lens part 234aC is configured to allow emission of light after changing, to the direction toward the grip part 10, the direction of the optical axis OAC1 of the light that is emitted from the light emitting element 232 and that is incident on the lens part 234aC. For example, a configuration may be adopted in which, first, the first light irradiation part is disposed such that the optical axis of light emitted from the light emitting element extends in the direction opposite to the direction toward the grip part, and the light is emitted after the lens changes the direction of the optical axis to the direction toward the grip part.

D4. Another Embodiment 4

(1) In the above-mentioned embodiments, the grip part 10 is disposed in such a way as to enclose the periphery of the rotary part 20. For example, in the case where the grip part is formed of two rod-like members that are disposed on both the left and right of the rotary part when the rotary part is in the reference angle position, the grip part need not be disposed in such a way as to enclose the periphery of the rotary part.

(2) In the above-mentioned embodiments, the configuration is adopted in which, when the rotary part 20 is in the reference angle position, the first light irradiation part 23 irradiates, with light, the portion of the grip part 10 that is located above the rotary part 20 in the vertical direction. For example, when the rotary part is in the reference angle position, the first light irradiation part may irradiate, with light, portions of the grip part that are located on both sides of the rotary part along the X axis.

D5. Another Embodiment 5

(1) In the above-mentioned embodiments, light emitted by the first light irradiation part 23 has an intensity distribution in which an angle position farther from the optical axis OA1 has a lower intensity. Light emitted by the first light irradiation part may have the property of intensity not changing at an angle position far from the optical axis.

(2) In the above-mentioned embodiments, the steering device 1 includes the second light irradiation part 24 having the same configuration as the first light irradiation part 23. For example, in a mode in which the first light irradiation part is disposed at a position that passes through the center of the rotary part and the Y axis when the rotary part is in the reference angle position, the steering device need not include the second light irradiation part.

In addition to the second light irradiation part, the steering device may include, for example, a third light irradiation part and a fourth light irradiation part each having the same configuration as the first light irradiation part. The third light irradiation part and the fourth light irradiation part may be disposed below the rotary part in the vertical direction when the rotary part is in the reference angle position.

In the mode in which the third light irradiation part and the fourth light irradiation part are disposed corresponding to the first light irradiation part and the second light irradiation part at positions below the rotary part in the vertical direction, for example, the first light irradiation part and the second light irradiation part may be controlled such that the first light irradiation part and the second light irradiation part alternately emit light when the control unit receives a manual operation shift signal. The control unit may control the third light irradiation part and the fourth light irradiation part such that the third light irradiation part and the fourth light irradiation part emit light simultaneously when the control unit receives a preceding vehicle start signal.

(3) In the above-mentioned embodiments, a portion of light emitted by the first light irradiation part 23 and a portion of light emitted by the second light irradiation part 24 overlap with each other. For example, in the case where light emitted by the first light irradiation part has the property of intensity not changing at an angle position far from the optical axis, a portion of light emitted by the first light irradiation part and a portion of light emitted by the second light irradiation part need not overlap with each other.

(4) In the above-mentioned embodiments, the first light irradiation part 23 and the second light irradiation part 24 are configured such that overlapping light impinges on the portion of the grip part 10 that is located above the rotary part 20 in the vertical direction. For example, the first light irradiation part and the second light irradiation part may be configured such that overlapping light impinges on a portion of the grip part that is located below the rotary part in the vertical direction.

D6. Another Embodiment 6

(1) In the above-mentioned embodiments, the steering device 1 is attached in the vehicle VW that allows either an automatic operation or a manual operation performed by the driver DR. The steering device may be attached to a vehicle that allows only the manual operation.

(2) In the above-mentioned embodiments, when the vehicle VW shifts from the automatic operation to the manual operation, the control unit 30 cause the first light irradiation part 23 and the second light irradiation part 24 to alternately emit light. For example, in a mode in which the steering device is attached to a vehicle that allows only the manual operation, the control unit need not cause the first light irradiation part and the second light irradiation part to alternately emit light.

(3) In the above-mentioned embodiments, the vehicle VW includes the range finder RF. For example, in a mode in which a preceding vehicle start signal is not sent to the control unit by the vehicle control unit, the vehicle need not include a range finder.

The present disclosure is not limited to the above-described embodiments, and may be achieved by various configurations without departing from the gist of the present disclosure. For example, to solve a part or a whole of the above-described problem or to achieve a part or a whole of the above-described effect, technical features in the embodiments that correspond to technical features in respective aspects described in SUMMARY may be suitably replaced or combined with each other.

Further, if such a technical feature is not described in this specification as an essential technical feature, such a technical feature may be deleted when appropriate. For example, the present disclosure may be achieved by a mode described below.

(1) According to one embodiment of the present disclosure, a steering device is provided. This steering device is a steering device provided to a mobile body, the steering device including: a rotary part rotatably attached to the mobile body; and a grip part configured to be gripped by a user, the grip part being connected to the rotary part, wherein the rotary part includes a first light irradiation part configured to emit light toward at least a portion of the grip part, the first light irradiation part includes a light emitting element configured to emit light at an angle range that is determined in advance, and a lens configured to narrow the angle range of the light emitted by the light emitting element, and when an extension direction of the at least the portion of the grip part to which the light is emitted is assumed as a first direction, a direction perpendicular to a direction of an optical axis of the light emitted by the first light irradiation part and to the first direction is assumed as a second direction, a plane including the optical axis and the first direction is assumed as a first plane, and a plane including the optical axis and the second direction is assumed as a second plane, the lens narrows the angle range of the light emitted by the light emitting element such that a first angle range is larger than a second angle range, the first angle range being an angle range of the light emitted by the first light irradiation part in the first plane, the second angle range being an angle range of the light emitted by the first light irradiation part in the second plane.

In this mode, compared with a mode in which the first angle range is equal to the second angle range or a mode in which the first angle range is smaller than the second angle range, it is possible to increase the proportion of light that impinges on the grip part, the light being emitted from the first light irradiation part.

(2) According to the embodiment of the present disclosure, in a state in which the steering device is attached to the mobile body, the lens may have a reflection surface that reflects light incident on the lens, thus defining one end of the angle range of the light on a front side, and of the light emitted at the second angle range in the second plane, light at a front end may impinge on the grip part.

In this mode, of the light emitted at the second angle range, light at the front end impinges on the grip part without passing around the grip part. Therefore, it is possible to further increase the proportion of light that impinges on the grip part, the light being emitted at the second angle range.

(3) According to the embodiment of the present disclosure, the lens may be configured to allow emission of light after changing, to a direction toward the grip part, a direction of the optical axis of the light that is incident on the lens.

In this mode, even in the case where the first light irradiation part is disposed such that the direction of the optical axis of the light emitted by the first light irradiation part is different from the direction toward the grip part, it is possible to cause the light to be incident on the grip part. It is possible to increase the degree of freedom in the arrangement of the first light irradiation part in the mobile body.

(4) According to the embodiment of the present disclosure, the grip part is disposed in such a way as to enclose the periphery of the rotary part. In a state in which the steering device is attached to the mobile body, the first light irradiation part may be configured to, when the rotary part is in a reference angle position, irradiate, with light, a portion of the grip part that is located above the rotary part in a vertical direction.

In this mode, a portion located above the rotary part in the vertical direction is irradiated with light. Accordingly, compared with a mode in which a portion located below the rotary part in the vertical direction is irradiated with light, the user can more easily visually perceive light that is reflected off the grip part.

(5) According to the embodiment of the present disclosure, the light emitted by the first light irradiation part may have an intensity distribution in which an angle position farther from the optical axis has a lower intensity, the rotary part may further include a second light irradiation part having a configuration equivalent to a configuration of the first light irradiation part, and the first light irradiation part and the second light irradiation part may be configured such that a portion of the light emitted by the first light irradiation part and a portion of light emitted by the second light irradiation part overlap with each other, and in a case in which the steering device is attached to the mobile body and the rotary part is in the reference angle position, the portion of the light emitted by the first light irradiation part and the portion of the light emitted by the second light irradiation part that overlap with each other impinge on the portion of the grip part that is located above the rotary part in the vertical direction.

In this mode, light from each of the first light irradiation part and the second light irradiation part has a higher light intensity at an angle position closer to the optical axis, and has a lower light intensity as the light becomes more distant from the optical axis. The portions irradiated with light overlap each other, thus allowing the user to easily visually perceive light.

(6) According to the embodiment of the present disclosure, the steering device may be attached to inside a vehicle that allows either an automatic operation or a manual operation performed by the user, the rotary part may further include a second light irradiation part having a configuration equivalent to a configuration of the first light irradiation part, the steering device may further include a control unit configured to control the first light irradiation part and the second light irradiation part, and the control unit may be configured to cause the first light irradiation part and the second light irradiation part to alternately emit the light when the vehicle shifts from the automatic operation to the manual operation.

In this mode, the first light irradiation part and the second light irradiation part alternately perform irradiation of light, thus achieving alternate blinking at the grip part. With such a configuration, even in a state in which the user is paying no attention to light at the grip part, it is possible to cause the user to easily notice the light.

What is claimed is:

1. A steering device provided to a mobile body, the steering device comprising:
    a rotary part rotatably attached to the mobile body; and
    a grip part configured to be gripped by a user, the grip part being connected to the rotary part, wherein
    the rotary part includes a first light irradiation part configured to emit light toward at least a portion of the grip part,
    the first light irradiation part includes
        a light emitting element configured to emit light at an angle range that is determined in advance, and
        a lens configured to narrow the angle range of the light emitted by the light emitting element, and
    when an extension direction of the at least the portion of the grip part to which the light is emitted is assumed as a first direction, a direction perpendicular to a direction of an optical axis of the light emitted by the first light irradiation part and to the first direction is assumed as a second direction, a plane including the optical axis and the first direction is assumed as a first plane, and a plane including the optical axis and the second direction is assumed as a second plane,
    the lens narrows the angle range of the light emitted by the light emitting element such that a first angle range is larger than a second angle range, the first angle range being an angle range of the light emitted by the first light irradiation part in the first plane, the second angle range being an angle range of the light emitted by the first light irradiation part in the second plane.

2. The steering device according to claim 1, wherein
    in a state in which the steering device is attached to the mobile body,
    the lens has a reflection surface that reflects light incident on the lens, thus defining one end of the angle range of the light on a front side, and
    of the light emitted at the second angle range in the second plane, light at a front end impinges on the grip part.

3. The steering device according to claim 1, wherein
    the lens is configured to allow emission of light after changing, to a direction toward the grip part, a direction of the optical axis of the light that is incident on the lens.

4. The steering device according to claim 1, wherein
    the grip part is disposed in such a way as to enclose a periphery of the rotary part, and
    in a state in which the steering device is attached to the mobile body,
    the first light irradiation part is configured to, when the rotary part is in a reference angle position, irradiate, with light, a portion of the grip part that is located above the rotary part in a vertical direction.

5. The steering device according to claim 4, wherein
    the light emitted by the first light irradiation part has an intensity distribution in which an angle position farther from the optical axis has a lower intensity,
    the rotary part further includes a second light irradiation part having a configuration equivalent to a configuration of the first light irradiation part, and
    the first light irradiation part and the second light irradiation part are configured such that
        a portion of the light emitted by the first light irradiation part and a portion of light emitted by the second light irradiation part overlap with each other, and
        in a case in which the steering device is attached to the mobile body and the rotary part is in the reference angle position, the portion of the light emitted by the first light irradiation part and the portion of the light emitted by the second light irradiation part that overlap with each other impinge on the portion of the grip part that is located above the rotary part in the vertical direction.

6. The steering device according to claim 1, wherein
    the steering device is attached to inside a vehicle that allows either an automatic operation or a manual operation performed by the user,
    the rotary part further includes a second light irradiation part having a configuration equivalent to a configuration of the first light irradiation part,
    the steering device further includes a control unit configured to control the first light irradiation part and the second light irradiation part, and
    the control unit is configured to cause the first light irradiation part and the second light irradiation part to alternately emit the light when the vehicle shifts from the automatic operation to the manual operation.

* * * * *